(12) United States Patent
Dunagan et al.

(10) Patent No.: US 9,104,392 B1
(45) Date of Patent: Aug. 11, 2015

(54) MULTITENANT MONITORING SYSTEM STORING MONITORING DATA SUPPORTING FLEXIBLE PIVOT QUERYING

(71) Applicant: Amazon Technologies, Inc., Reno, NV (US)

(72) Inventors: John David Dunagan, Redmond, WA (US); Derek Solomon Pai, Seattle, WA (US); Caitlyn Rose Shim, Seattle, WA (US); John W. Heitmann, Seattle, WA (US); Michael R. Foster, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 226 days.

(21) Appl. No.: 13/917,595

(22) Filed: Jun. 13, 2013

(51) Int. Cl.
*G06F 17/30* (2006.01)
*G06F 7/24* (2006.01)

(52) U.S. Cl.
CPC ........................ *G06F 7/24* (2013.01)

(58) Field of Classification Search
None
See application file for complete search history.

(56) References Cited

U.S. PATENT DOCUMENTS

| | | |
|---|---|---|
| 7,543,054 B1 | 6/2009 | Bansod et al. |
| 7,895,191 B2 | 2/2011 | Colossi et al. |
| 2002/0138316 A1 | 9/2002 | Katz et al. |
| 2005/0278290 A1 | 12/2005 | Bruce et al. |
| 2007/0233651 A1 | 10/2007 | Deshpande et al. |
| 2010/0287146 A1* | 11/2010 | Skelton et al. ............... 707/705 |
| 2011/0231848 A1* | 9/2011 | Long et al. .................... 718/101 |
| 2013/0073731 A1* | 3/2013 | Bose et al. .................... 709/226 |
| 2014/0032611 A1* | 1/2014 | Chu et al. ...................... 707/803 |

OTHER PUBLICATIONS

Nagios Enterprises, "Nagios XI—Product Overview," <http://assets.nagios.com/datasheets/nagiosxi/Nagios XI - Product Overview.pdf>, 2 pages (Jan. 2010).
Nagios Enterprises, "Products," < http://www.nagios.com/products>, 2 pages (accessed May 21, 2013).
RRDtool, "rrdtool," <http://oss.oetiker.ch/rrdtool/doc/rrdtool.en.html>, 9 pages (accessed May 21, 2013).
RRDtool, "rrdtutorial," <http://oss.oetiker.ch/rrdtool/doc/rrdtutorial.en.html>, 36 pages (accessed May 21, 2013).

* cited by examiner

*Primary Examiner* — Wilson Lee
(74) *Attorney, Agent, or Firm* — Klarquist & Sparkman, LLP

(57) ABSTRACT

Monitoring data can be received and managed in a multi-tenant environment. Monitoring data can be received for multiple tenants. The received monitoring data can be sorted. Sorting can be performed based on various criteria, such as by tenant. The sorted monitoring data can be written to data files. Each data file can store monitoring data for a plurality of tenants. Receiving, sorting, and writing monitoring data can be performed within a multi-tenant monitoring system.

21 Claims, 10 Drawing Sheets

SOFTWARE 1080 IMPLEMENTING DESCRIBED TECHNOLOGIES

MULTITENANT MONITORING SYSTEM STORING MONITORING DATA SUPPORTING FLEXIBLE PIVOT QUERYING

BACKGROUND

In a computing environment with many computing devices, such as a virtual server or cloud computing environment with many computer servers, monitoring the operation and performance of such computing devices can be a difficult task. For example, a customer may want to monitor performance, such as processor utilization or memory utilization, of a number of virtual computing resources to ensure that they are operating correctly.

In order to monitor operation and performance of computing resources, monitoring data can be collected. Some solutions have been developed that aggregate monitoring data and store the aggregated monitoring data in a database structure. Once the monitoring data has been aggregated and stored in the database, querying can be performed.

However, such existing monitoring solutions suffer from a number of limitations. For example, query options using pre-aggregated monitoring data are limited based on how the data was aggregated.

Furthermore, the cost of performing a query using such existing monitoring solutions may not be predictable in terms of time or computing resources. For example, a customer may not know if a particular query will take a number of seconds or minutes, how the particular query will scale as the amount of monitoring data, or the time period, increases, etc.

Therefore, there exists ample opportunity for improvement in technologies related to managing monitoring data.

DETAILED DESCRIPTION

Overview

Figure 1:
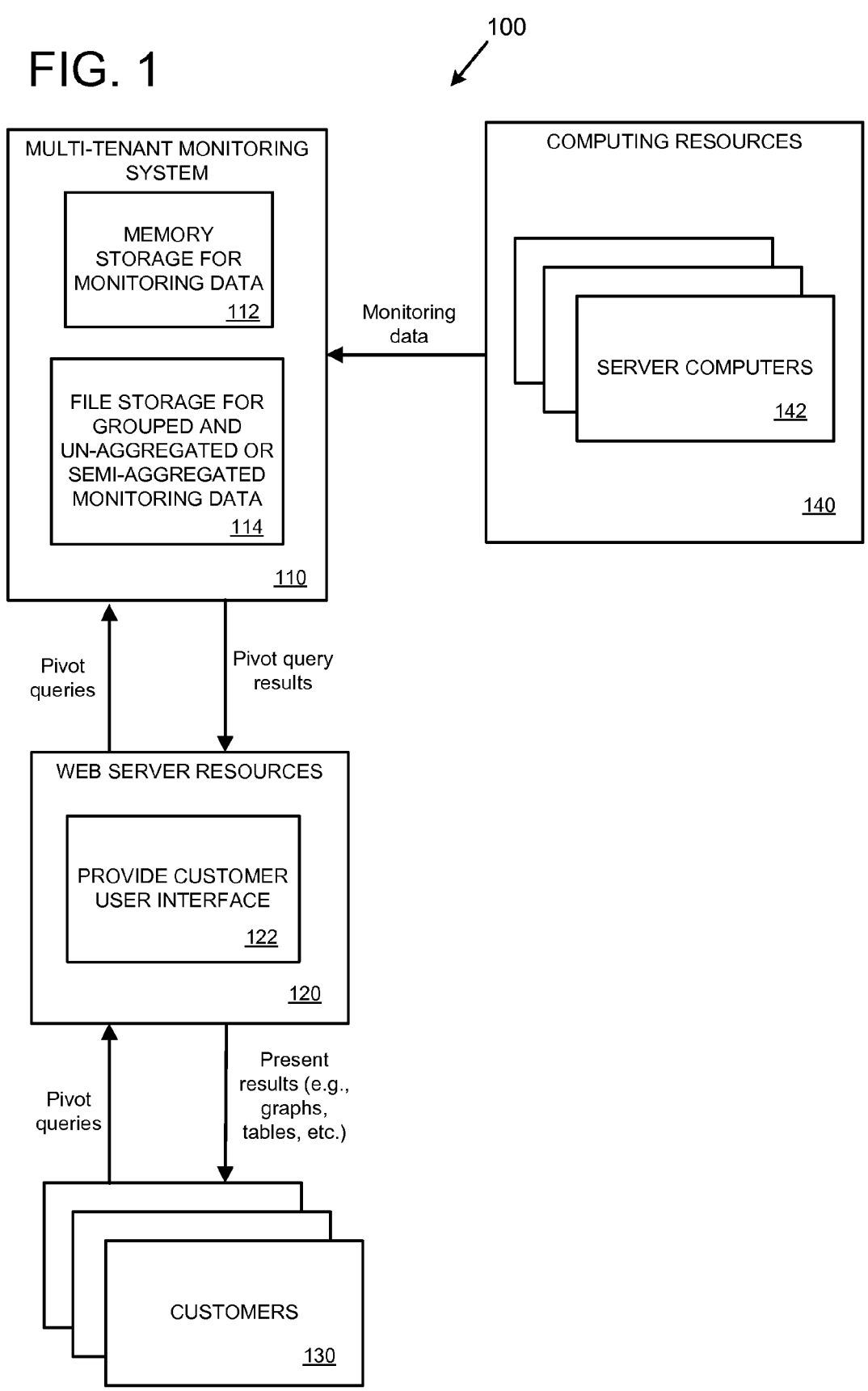
FIG. 1 is a block diagram of an example environment supporting flexible pivot querying of monitoring data for multiple tenants.

The following description is directed to techniques and solutions for managing data (e.g., monitoring data and/or other types of data) in an environment (e.g., a multi-tenant environment) supporting pivot queries. For example, a multi-tenant monitoring system can be provided for receiving monitoring data, sorting the received monitoring data, and writing the sorted monitoring data to data files. The multi-tenant monitoring system can also be provided for serving pivot queries, including reading stored monitoring data, aggregating along one or more dimensions, and presenting results.

Monitoring data can be received and sorted. For example, unsorted monitoring data can be received (e.g., accumulated) for multiple tenants (customers) for a period of time and then sorted (e.g., before being written to file storage). Sorting the unsorted monitoring data can be performed based on a variety of criteria, including grouping by customer and/or by other aspects (e.g., other dimensions, such as geographical region, software version, and/or other meta-data).

Monitoring data can be stored. For example, monitoring data can be stored by writing sorted monitoring data to data files. Each data file can store monitoring data for multiple customers (e.g., a single data file may store monitoring data for 5, 10, or more customers). Information can be maintained indicating which customers' monitoring data is stored in which data file, without knowing the position of each customer's data within any given file.

Monitoring data can be re-sorted. Re-sorting stored monitoring data can comprise reading sorted monitoring data for each of a plurality of time periods, re-sorting the read monitoring data comprising combining sorted monitoring data to use fewer time periods having a longer time period length, and writing the re-sorted monitoring data to data files.

Monitoring data can be received, sorted, stored, and/or re-sorted in data files without aggregating the monitoring data across any dimensions (e.g., dimensions that can later be selected for aggregation during pivot querying). By not aggregating the monitoring data, customers can perform flexible pivot queries with aggregation along one or more dimensions being performed at query time.

Pivot queries can be performed using stored monitoring data. For example, a customer of a multi-tenant monitoring system can submit pivot queries to be processed by the multi-tenant monitoring system. The multi-tenant monitoring system can read monitoring data (e.g., for one or more time periods), perform aggregation (e.g., aggregate based on metric types, based on aspects such as geographical region, instance type, request type, API type, and/or based on other dimensions of the monitoring data and associated meta-data), and present results to the customer (e.g., in the form of tables, graphs, charts, etc.).

Recommendations can be provided using pivot queries. For example, pivot queries can be performed using monitoring data across various dimensions, results can be compared, and recommendations made to improve performance (e.g., recommendations indicating which components or versions perform better than others).

The techniques and solutions described herein for managing monitoring data in a multi-tenant environment supporting pivot queries can provide flexibility and improved performance when compared to other solutions. For example, receiving, sorting, and storing monitoring data in un-aggregated or semi-aggregated format allows flexibility when performing later pivot queries along various dimensions. Storing monitoring data in data files without additional indexing (e.g., other than indicating which customers' monitoring data is stored in each data file, and not at the level of individual metric values or observations) allows large volumes of monitoring data to be received, sorted, and stored while using fewer computing resources. Furthermore, using the techniques and solutions described herein, performing pivot queries (e.g., including reading monitoring data from data files, aggregating across one or more dimensions, and presenting the results) can be performed at a predictable cost regardless of the amount of monitoring data being processed or the time period being analyzed (e.g., pivot queries can scale linearly).

In contrast, systems for managing monitoring data using database solutions may provide less flexibility and be less efficient. For example, database solutions may pre-aggregate monitoring data before the monitoring data is stored (e.g., by performing such pre-aggregation across various dimensions, such as geographical region or software version), which requires more computing resources and reduces flexibility during querying. In addition, indexing performed by database solutions (e.g., which can include indexing at the level of individual or aggregated metric values) uses more computing resources (e.g., processor and storage resources). Furthermore, performing querying (e.g., pivot querying) using a database solution (e.g., a Structured Query Language (SQL) based database solution) can be unpredictable (e.g., a customer may not know how long a particular query will take or how much the particular query will cost in terms of computing resources or money).

Monitoring Data

In any of the embodiments described herein, monitoring data can be collected from computing resources. Monitoring data includes any type of data that can be collected from computing resources that relates to the operation of the computing resources. For example, monitoring data can comprise metric types such as central processing unit (CPU) utilization (e.g., CPU utilization percentage of a physical or virtual machine), memory utilization, storage utilization, network utilization, response time (e.g., web site response time, application programming interface (API) response time, etc.), read/write latency (e.g., for disk drives or storage volumes), etc.

Monitoring data can be collected on a periodic basis. For example, CPU utilization percentage can be collected for a virtual machine every second, every minute, or at another interval.

Monitoring data can be associated with meta-data. Meta-data indicates the source of the monitoring data and/or other types of associations between the monitoring data and various entities, groups, or properties. For example, monitoring data, such as CPU utilization, can be associated with meta-data that identifies the particular virtual machine from which the CPU utilization was collected (e.g., virtual machine 1) and the particular geographical region within which the particular virtual machine is located (e.g., U.S. region, European region, etc.). As an example, server response time monitoring data can be collected that is associated with meta-data indicating a particular virtual machine (e.g., virtual machine 1), a virtual machine type or category (e.g., high storage virtual machine), a geographical region (e.g., U.S. region), a particular software version (e.g., web server version 1.5), etc.

The techniques and solutions described herein can also be applied to other types of data. For example, in some embodiments, data (e.g., financial data, sales data, product data, and/or other types of data) can be managed using the techniques and solutions described herein, including receiving data, sorting data, storing data in data files, re-sorting stored data, performing pivot queries using stored data, etc.

Receiving Monitoring Data

In any of the embodiments described herein, monitoring data can be received from computing resources. For example, monitoring data can be received from server computers (e.g., physical and/or virtual machines), database servers, networking resources, and/or other computing resources. In some embodiments, monitoring data is received within a cloud computing environment.

Monitoring data can be received by a multi-tenant monitoring system. For example, the multi-tenant monitoring system (e.g., a collection of server computer and/or storage resources) can receive monitoring data from computing resources that are associated with a number of customers (tenants). For example, a cloud computing environment can provide computing resources to a number of customers. The cloud computing environment can also provide a multi-tenant monitoring system that provides monitoring services, including receiving and storing monitoring data from the computing resources and providing access to monitoring data by the customers (e.g., servicing pivot query requests from the customers of the cloud computing environment).

Monitoring data can be received for a period of time. In some embodiments, unsorted monitoring data is received from computing resources associated with multiple tenants. The unsorted monitoring data is received and accumulated (e.g., buffered) in memory (e.g., random-access memory (RAM)). For example, the unsorted monitoring data can be received and accumulated for a number of seconds or minutes. The amount of monitoring data that is received and accumulated (e.g., corresponding to an amount of time) can be determined based on an amount of available memory (e.g., an amount of available RAM). Depending on implementation details, monitoring data can be accumulated until a threshold amount of available memory has been used (e.g., 90% of available memory) at which point the accumulated monitoring data can be grouped and written to file storage.

Data (e.g., monitoring data and/or other types of data) that is associated with multiple sources can also be received. For example, data can be received where the data is associated with users, accounts, customers, groups, and/or resources (e.g., computing resources). For example, data that is associated with multiple users or accounts can be received (e.g., received from computing resources owned or operated by the users or accounts).

Sorting Monitoring Data

In any of the embodiments described herein, monitoring data can be sorted. For example, unsorted monitoring data can be received (e.g., accumulated) for a period of time and then sorted (e.g., before being written to file storage). Sorting the unsorted monitoring data can be performed based on a variety of criteria, including by customer and/or by other aspects (e.g., other dimensions, such as geographical region, software version, and/or other meta-data).

In some embodiments, unsorted monitoring data is received for multiple tenants for a period of time (e.g., accumulated in memory of a multi-tenant monitoring system for a period of seconds or minutes and/or until a percentage of available memory is full). Once the unsorted monitoring data has been received for the period of time, it is sorted (e.g., sorted in a single pass). The sorting includes grouping the monitoring data at least by customer. For example, all of the monitoring data associated with each particular customer is grouped together (e.g., for each customer, the monitoring data obtained from that customer's computing resources, such as that customer's virtual machine instances, is grouped together).

Sorting can also be performed based on other aspects of a customer (e.g., sub-sorting within a customer based on metric type, meta-data, and/or other criteria). For example, the monitoring data for a particular customer can be further sorted (e.g., sub-sorted) based on metric types such as CPU utilization, response times, request counts, storage utilization, etc., and/or by meta-data (e.g., by geographical region, software version, virtual machine type, etc.).

Performing additional sorting may be efficient in some situations. For example, consider a customer that wants to view monitoring data based on request count (e.g., request count aggregated by server and/or by API). If the request count monitoring data is grouped together within the customer's monitoring data, then retrieving just the request count monitoring data can be more efficient (e.g., if the customer's monitoring data spans multiple files, but the request count data is located just within one file, the just the one file can be read).

Storing Monitoring Data

In any of the embodiments described herein, monitoring data can be stored. For example, unsorted monitoring data can be received (e.g., accumulated) for a period of time, sorted, and stored by writing the sorted monitoring data to files.

In some embodiments, sorted monitoring data is written to data files. The files can be of a particular size (e.g., a uniform size or a generally uniform size). The size of the files can be determined, for example, based on efficiency of writing and/or reading the files using the file storage software and/or hardware used to read and write the files. In a specific embodiment, 2 MB file sizes are used.

In some embodiments, sorted monitoring data for multiple tenants can be written to the same file. Storing sorted monitoring data for multiple tenants in a single file can make efficient use of computing resources and storage resources. For example, computing resources can be saved by not dividing sorted monitoring data among different data files during writing and by maintaining a uniform file size for writing and/or reading efficiency. Similarly, storage resources can be saved by not writing multiple small files for tenants that may have little monitoring data. For example, a cloud computing environment may support multiple small tenants. As a result, monitoring data for a particular period of time for some of the tenants may not be enough to fill an entire file (e.g., a 2 MB file). In such a situation, a file may store monitoring data for a number of tenants (e.g., 5 tenants, 10 tenants, or more).

As an example, consider a multi-tenant monitoring system that receives and accumulates monitoring data for multiple tenants in 2 GB of available RAM. When the 2 GB of available RAM is full, the multi-tenant monitoring system sorts the monitoring data (e.g., groups the data at least by customer in a single sorting pass) and writes the sorted monitoring data to files (e.g., using local physical disk storage, virtual storage volumes, etc.). For example, the sorted monitoring data can be written using 2 MB data files (e.g., the first 2 MB of the sorted monitoring data can be written to the first file, the second 2 MB of the sorted monitoring data can be written to the second file, and so on until approximately 1,000 files have been written accounting for the 2 GB of monitoring that was accumulated in RAM). In some implementations, the files are of uniform size (e.g., 2 MB). In other implementations, the files are generally uniform (e.g., some files may have slightly more or less data, which can depend on whether customer data can be split between files).

In some embodiments, monitoring data that is written to file storage is not aggregated. For example, monitoring data can be received, sorted, and written to file storage without aggregation being performed (e.g., without aggregating metric values based on time periods or meta-data, such as aggregating CPU utilization by a geographical region).

In other embodiments, monitoring data is semi-aggregated. With monitoring data that is semi-aggregated, aggregation may be performed for metric values within a time period. For example, during a one-minute monitoring time period, 1,000 metric values may be received for CPU utilization of a particular virtual machine. These 1,000 metric values may be aggregated within the one-minute monitoring time period before being written to data files. The aggregation of the metric values can be performed in a lossless manner (e.g., using lossless data compression techniques), in a lossy manner (e.g., using a lossy data compression technique, such as by quantizing the CPU utilization values using a reduced set of possible values), and/or using a combination of techniques (e.g., quantization and compression of quantized values). However, with semi-aggregated monitoring data, aggregation is not performed across dimensions. For example, if region is a dimension that can be selected by a pivot query, then the region dimension will not be aggregated when the monitoring data is written to the data files.

Storing sorted monitoring data in un-aggregated or semi-aggregated format provides for flexibility when the data is read and utilized. For example, monitoring data can be read when it is needed and aggregated based on any desired dimensions (e.g., based on various meta-data, such as geographical region, instance type, software version, API, etc.). Furthermore, storing sorted monitoring data in un-aggregated or semi-aggregated format saves computing resources as aggregation is not performed when the data is stored. The savings in computing resources can be particularly significant in a multi-tenant monitoring system as data may be read infrequently (e.g., in a typical monitoring system, most monitoring data may never be read). For example, monitoring data may be accessed by a customer if the customer is diagnosing a problem, which may be a rare occurrence.

Monitoring data that is written to file storage is under-indexed. In some embodiments, the only indexing that is performed is to keep track of each customer and in which file (or files) the customer's data is located. For example, a multi-tenant monitoring system can maintain information indicating that monitoring data for "Customer A" is located in "file 1," but not maintain any information indicating where in file 1 the data is located (e.g., file 1 may contain monitoring data for many customers, and the monitoring data for Customer A, while it is grouped together within the file, may be located anywhere within the file). Therefore, with these embodiments, the monitoring data within the data files is not indexed, and the only index information that is maintained is the relationship between customers and in which file (or files) each of the customer's data is located. In other embodiments, indexing is not performed at the level of individual observations (individual metric values or individual data points).

Under-indexing monitoring data stored in files can be efficient in a multi-tenant monitoring system. For example, by under-indexing monitoring data (e.g., by only maintaining information indicating customer to file relationships) reduces the computing resources needed to receive, process, and store the monitoring data (e.g., processing time and memory is reduced because index information does not need to be maintained for each element of monitoring data). In contrast, a typical database (e.g., a SQL-based database) may maintain index information for all of the elements (e.g., according to a database schema), which can be costly (e.g., in terms of time and computing resources) to store and retrieve.

In some embodiments, the multi-tenant monitoring system does not update monitoring data in a file. The monitoring data may be read (e.g., when used for reporting or analysis, or during re-sorting), and new data files may be written (e.g., during re-sorting), but the monitoring data in a data file is not updated or modified in that data file.

Re-Sorting Monitoring Data

In any of the embodiments described herein, stored monitoring data can be re-sorted. For example, unsorted monitoring data can be received (e.g., accumulated), sorted, and stored by writing to a new set of files for each of a number of time periods. In this manner, each set of files stores monitoring data for its respective time period (e.g., a first set of files stores monitoring data for a first time period of 1 minute, a second set of files stores monitoring data for a second time period of 1 minute (that is the next minute after the first time period), and so on).

In some embodiments, re-sorting stored monitoring data comprises reading the sorted monitoring data for each of a plurality of time periods, re-sorting the read monitoring data comprising combining sorted monitoring data to use fewer time periods having a longer time period length, and writing the re-sorted monitoring data to files.

In some situations, older monitoring data is accessed less frequently than newer monitoring data, and with larger granularity (e.g., older monitoring data may be less useful in diagnosing current problems and more useful in analyzing longer-term trends). Therefore, it can be helpful and efficient to re-sort the monitoring data stored in the files (e.g., for monitoring data older than a pre-determined, or user-selected, amount of time).

Consider an example where monitoring data is received, sorted, and stored every minute. After one hour, 60 sets of files will be stored, with each set of files storing monitoring data for a one minute period of time. At some point, the one hour of monitoring data can be re-sorted (e.g., when it is older than a pre-determined or user-selected amount of time, such as older than 6 hours). For example, the 60 sets of files can be read, re-sorted (e.g., to combine sorting monitoring data, including grouping by customer, over a longer time period, such as 60 minutes instead of 1 minute). The re-sorted monitoring data can then be written back to files. For example, the same number of files can be used to store the re-sorted monitoring data, but with each file storing re-sorted monitoring data for a longer period (e.g., 60 minutes) but for fewer customers (e.g., if the original files stored monitoring data for an average of 300 customers per file, then each file storing re-sorted monitoring data may store re-sorted monitoring data for approximately 5 customers).

Re-sorting of stored monitoring data files can be performed on a periodic basis (e.g., as a background process). For example, when stored monitoring data is older than a certain time (e.g., older than 1 day), then the stored monitoring data can be automatically read, re-sorted, and written out as new files with each file storing monitoring data for a longer period of time.

To illustrate how re-sorting operates, take a set of x files, each approximately 2 MB in size, storing monitoring data for y customers in each file for a time period of z minutes. Assume that re-sorting is performed such that the period of time stored in each file is 10 times as long as was originally stored. After re-sorting, a new set of x files, each approximately 2 MB in size, is written with each new file storing data for y/10 customers for z*10 minutes.

Reading Monitoring Data

In any of the embodiments described herein, monitoring data can be read. For example, monitoring data can be read and used for analysis or reporting (e.g., to generate tables or graphs of monitoring data). Analysis and reporting can be performed in order to diagnose problems (e.g., problems with operation of a customer's server computers, such as the customer's virtual machine instances).

In some embodiments, because the monitoring data is under-indexed, reading monitoring data associated with a particular customer involves reading a data file (or multiple data files, such as when the customer's data is split between two data files because the data did not all fit at the end of one data file) that contain the customer's monitoring data, and extracting the customer's data from the read file (e.g., the file may store monitoring data for multiple customers).

Reading monitoring data for a particular customer can be performed for multiple time periods. For example, if a customer wants to perform pivot queries using monitoring data over the last hour, and if the monitoring data is stored in sets of files written every 10 minutes, then the file (or files) from each 10 minute set of files that stores monitoring data for that customer can be read (e.g., 6 files can be read if the customer's data is stored in one file for each 10 minute time period).

Aggregating Monitoring Data

In any of the embodiments described herein, monitoring data can be read and aggregated. For example, monitoring data that is stored in files can be read and aggregated in order to support pivot queries (e.g., the monitoring data can be read and aggregated across one or more dimensions reflected in the monitoring data and/or associated meta-data).

Reading and aggregating monitoring data can be predictable. For example, consider a customer that wants to perform pivot queries using monitoring data for average latency of web site requests. If the customer wants to perform the queries on the last 10 minutes of monitoring data, and the multi-tenant monitoring system writes monitoring data to files every 10 minutes, the reading the monitoring data for the customer only involves reading one file and extracting the customer's monitoring data (sometimes more than one file may need to be read, such as when the customer's monitoring data rolls over from one file to another). Once the customer's data has been read, aggregation can be performed. For example, if the customer wants to aggregate the monitoring data for the average latency of web site requests across regions (e.g., split by each region in which the customer operates web servers), then the aggregation can be performed by maintaining a count of each region. If the customer also wants to aggregate the monitoring data across another dimension (e.g., by API type), then aggregation can be performed by maintain additional counts (or other types of statistics) across the other dimensions (e.g., by maintaining counts for each API type).

Reading and aggregating monitoring data can be predictable and it can scale linearly with additional time periods. For example, pivot queries for a customer using the last 10 minutes of monitoring data (where the monitoring data is written to files every 10 minutes) can be accomplished by reading one file and performing one aggregation step (e.g., to aggregate across one or more dimensions). Performing pivot queries for the same customer using the last 20 minutes of monitoring data can be accomplished by reading two files and performing one aggregation step. Extending querying ability over each additional time period can generally be accomplished by reading an additional file. In this manner, extending querying over additional time periods can scale linearly with the number of additional time periods.

In some situations, reading and aggregating monitoring data can be more efficient with re-sorting of monitoring data. For example, reading one hour of monitoring data for a customer, where the monitoring data is stored in 10 minute time periods, can be done by reading 6 files (one for each 10 minute period). However, if the one hour of monitoring data has been re-sorted and written using a one hour time period, then reading the same monitoring data for the customer can be done by reading just one file.

Because reading and aggregating data is predictable (e.g., and can scale linearly based on time) in terms of time and computing resources, the cost to customers can be predicted ahead-of-time. For example, if a customer wants to perform a pivot query using 10 minutes of monitoring data across a certain dimension, then the user can be presented with a cost (e.g., cost in terms of money, time, and/or computing resources) before the customer executes the pivot query. Similarly, if the customer wants to expand the pivot query to 30 minutes of monitoring data, the customer can know that the cost will be approximately 3 times greater (e.g., corresponding to the need to read 3 data files instead of 1 data file, while still performing one aggregation pass to aggregate across one or more dimensions).

In contrast, with a traditional database approach (e.g., using a SQL-based database or another type of indexed database where monitoring data is pre-aggregated), the cost of performing a query may be difficult to predict and/or the cost may vary widely depending on the length of time, amount of data, dimensions, etc.

Scale Out

In any of the embodiments described herein, a multi-tenant monitoring system serving pivot queries can scale out to support additional capacity. For example, the multi-tenant monitoring system can scale out to support more and/or larger customers (e.g., customers with larger amounts of monitoring data).

Scaling out can be performed by partitioning monitoring data by customer. For example, a first set of servers (e.g., with corresponding file storage facilities) can store monitoring data for a first group of customers, a second set of servers can store monitoring data for a second group of customers, and so on. Similarly, other functions performed by the multi-tenant monitoring system (e.g., performing pivot queries, which can include reading, aggregating, and presenting results) can be partitioned by groups of customers.

Scaling out can be performed based on other aspects, such as metric type. For example, monitoring data for one or more metric types can be stored by one server while monitoring data for one or more other metric types can be stored by a different server.

Scaling out can be performed based on time periods. For example, monitoring data can be received, sorted, and written to file storage by a first group of servers during a first 12-hour period, by a second group of servers during a second 12-hour period, and so on.

Scaling out can use a combination of techniques. For example, monitoring data can be partitioned by customer, and within the customers it can be further partitioned by time and/or by metric types.

Scaling out can be an efficient way to add capacity. For example, by using scaling out, additional computer servers (e.g., with corresponding file storage capacity) can be added to handle additional and/or larger customers.

Performing Pivot Queries on Monitoring Data

In any of the embodiments described herein, pivot queries can be performed on monitoring data. For example, a customer of a multi-tenant monitoring system can submit pivot queries to be processed by the multi-tenant monitoring system. The multi-tenant monitoring system can read monitoring data (e.g., for one or more time periods), perform aggregation (e.g., aggregate based on metric types, based on aspects such as geographical region, instance type, request type, API type, and/or based on other dimensions of the monitoring data and associated meta-data), and present results to the customer (e.g., in the form of tables, graphs, charts, etc.).

As an example, consider a customer of a cloud computing environment where the customer operates 100 hosts serving a web site with millions of hits per day. The customer may want to view monitoring data for the web sites (e.g., to monitor performance, to diagnose problems, to predict future capacity needs, or for another purpose). To accomplish this task, the customer can perform pivot queries to view monitoring data for different time periods across one or more dimensions. For example, the customer can perform a pivot query to view the last 20 minutes of web site response time monitoring data (e.g., one of a number of metric types of stored monitoring data) for just the hosts (of the 100 hosts) that are serving the Canada region. The customer can then perform additional pivot queries along other or additional dimensions. For example, the customer may want to drill down to response times for hosts serving the Canada region where the response times are for requests by iOS® version 4 devices.

Providing Recommendations Using Pivot Queries

In any of the embodiments described herein, recommendations can be provided. For example, recommendations can be provided with a multi-tenant monitoring system using pivot queries. Recommendations can be provided to customers so that the customers can improve performance of their systems (e.g., their physical or virtual computing resources).

Recommendations can be made using comparisons. For example, a customer can perform pivot queries using monitoring data across one or more dimensions. The pivot queries can be used to compare the performance of the various dimensions to determine which perform better than others. For example, a customer that is running a web server running a combination of software components can perform pivot queries to determine performance of various aspects of the software components (e.g., to measure performance of the software components individually or in combination, to measure performance of different metric types, such as response times, and/or to measure other performance aspects). Similarly, a customer can compare different software components running on different web servers and/or compare components that the customer is running with components (e.g., different combinations of components) operated by other customers, subject to appropriate privacy protections.

As an example, consider a customer that is operating web servers that use a GetPrice software component that is either version 1 or 2, and a GetPicture software component that is either version 1 or 2. The customer may want to know which combination, of the four possible combinations of components and versions, will produce the best relative results (e.g., have the best response time, the lowest resource utilization, etc.). In order to determine the best combination, the user can perform pivot queries along various dimensions for the various combinations (e.g., GetPrice version 1 with GetPicture version 1, GetPrice version 1 with GetPicture version 2, and so on).

In some embodiments, recommendations can be performed automatically. For example, pivot queries can be automatically executed along various dimensions (e.g., pre-defined or user-configured dimensions, such as CPU utilization, response time, etc.) for each of a number of available configurations of hardware and/or software components, including different versions of hardware and/or software components. The results of running such pivot queries can then be compared to make the recommendation. Results from different customers (e.g., who may be using different combinations of hardware and/or software components or different versions) can also be compared in making the recommendations.

Environment Supporting Pivot Querying of Monitoring Data

In any of the embodiments described herein, an environment can be provided that supports flexible pivot querying of monitoring data for multiple tenants (multiple customers). For example, the environment can be provided as part of a virtual server environment or a cloud computing environment that provides computing resources to multiple tenants where the environment also supports storing monitoring data for the computing resources for use during pivot querying.

FIG. 1 is a diagram of an example environment 100 comprises a multi-tenant monitoring system 110 supporting flexible pivot querying of monitoring data for multiple tenants. The multi-tenant monitoring system 110 comprise computing resources (e.g., pivot server resources), such as computer servers, storage resources, networking resources, and/or other computing resources, for receiving and storing monitoring data, receiving pivot queries, providing pivot query results, and for performing other operations supporting pivot querying of monitoring data as described herein. The multi-tenant monitoring system 110 can be a centralized system or a distributed system.

The environment 100 also comprises computing resources 140. The computing resources 140 comprise server computers 142. The server computers 142 can provide computing resources for virtual machine instances (e.g., virtual machine instances executing software, such as web server instances, database server instances, and other types of instances). The computing resources 140 can also comprise other types of resources, such as storage resources, networking resources, and data communication resources.

The computing resources 140 provide monitoring data to the multi-tenant monitoring system 110. For example, the server computers 142 can include resources (e.g., hardware and/or software) for collecting monitoring data (e.g., CPU utilization, memory utilization, storage utilization, response times, and/or other types of metrics). The resources for collecting monitoring data can include software clients (e.g., monitoring services) running on the server computers 142. The monitoring data can be provided directly from the server computers 142 to the multi-tenant monitoring system 110. The monitoring data can also be provided indirectly. For example, other computing resources (e.g., monitoring servers) can receive monitoring data from the server computers 142 and forward the data to the multi-tenant monitoring system 110.

The computing resources 140 provide meta-data associated with the monitoring data to the multi-tenant monitoring system 110. For example the meta-data can include information identifying a host (e.g., a specific server computer or virtual machine) providing the monitoring data, an application programming interface (API) associated with particular monitoring data (e.g., response times for a particular API), geographical region of a host, software version information, etc.

The multi-tenant monitoring system 110 can receive and buffer the monitoring data in memory 112 for a period of time (e.g., based on available memory), then sort the received monitoring data and write out the grouped monitoring data to file storage 114. The multi-tenant monitoring system 110 can receive, sort, and write monitoring data to data files for each of a plurality of time periods. The multi-tenant monitoring system 110 can also re-sort stored monitoring data.

The environment 100 also comprises web server resources 120. The web server resources 120 provide a user interface 122 for interacting with the multiple customers (tenants) 130 that utilize the environment 100. Alternatively, the web server resources 120 can be located within, or provided by, the multi-tenant monitoring system 110.

The web server resources 120 receive pivot queries from the customers 130. For example, the customers 130 can access various user interface (e.g., graphical user interfaces) provided by the web server resources 120 to configure and enter pivot queries. For example, the customers 130 can configure pivot queries to analyze monitoring data over one or more dimensions, including selecting metric types (e.g., CPU utilization, response times for various interfaces and/or APIs, memory or storage utilization, etc.) and meta-data (e.g., analyze monitoring data for hosts located in a particular geographical region).

The web server resources 120 present results of pivot queries to the customers 130. For example, the results can be presented in the form of tables, graphs, etc.

Storing Monitoring Data for Use During Pivot Querying

In any of the embodiments described herein, monitoring data can be stored in data files for use in serving pivot queries. For example, the monitoring data can be received, sorted, and stored, and when the stored monitoring data is needed to serve pivot queries it can be read, aggregated and output (e.g., presented to customers).

Figure 2:
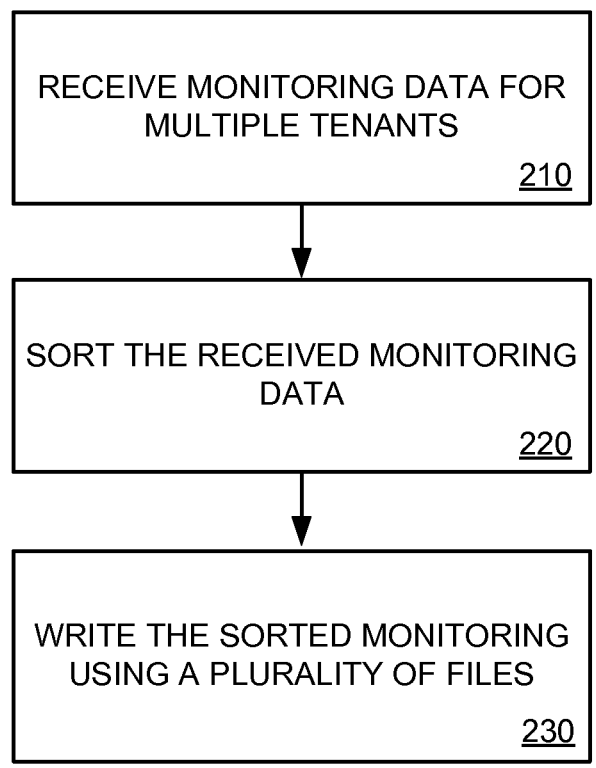
FIG. 2 is a flowchart of an example method for storing monitoring data for use during pivot querying.

FIG. 2 is a flowchart of an example method 200 for storing monitoring data for use during pivot querying. The method 200 can be performed, for example, by a multi-tenant monitoring system, such as multi-tenant monitoring system 110.

At 210, monitoring data is received for multiple tenants. For example, the monitoring data can be received from computing resources (e.g., server computers, virtual computing resources, etc.) operated or managed by the tenants. The monitoring data can be received from within a cloud computing environment that provides computing resources to the multiple tenants. The monitoring data can be received for a period of time (e.g., a number of seconds or minutes). For example, the monitoring data can be received for a period of time corresponding to an available amount of RAM.

At 220, the monitoring data that is received at 210 is sorted. The monitoring data can be sorted based on a number of criteria. For example, the monitoring data can be grouped together for each tenant. Monitoring data can also be grouped by one or more metric types (e.g., sub-grouped within the monitoring data for each tenant).

At 230, the sorted monitoring data is written to storage using a plurality of data files. Each data file can store monitoring data for multiple tenants. For example, a first data file can store grouped monitoring data for a number of tenants, a second data file can store grouped monitoring data for a number of different tenants, and so on. The data files can be the same size or substantially the same size (e.g., the data files can be 2 MB each). In some embodiments the grouped monitoring data stored in the data files is not aggregated (e.g., the individual metric values can be stored without being replaced with aggregate values, such as by summing, computing an average, median, minimum, maximum, or other aggregate function). In some embodiments, the grouped monitoring data stored in the data files is not aggregated across any dimensions. In some embodiments the grouped monitoring data stored in the data files is under-indexed. For example, within the data files, the monitoring data is not indexed, and the only index information that is maintained is the relationship between a customer and which data file(s) contain that customer's monitoring data. Alternatively, the monitoring data stored in the data files is not indexed at a level of individual observations (individual metric values or individual data points).

Figure 3:
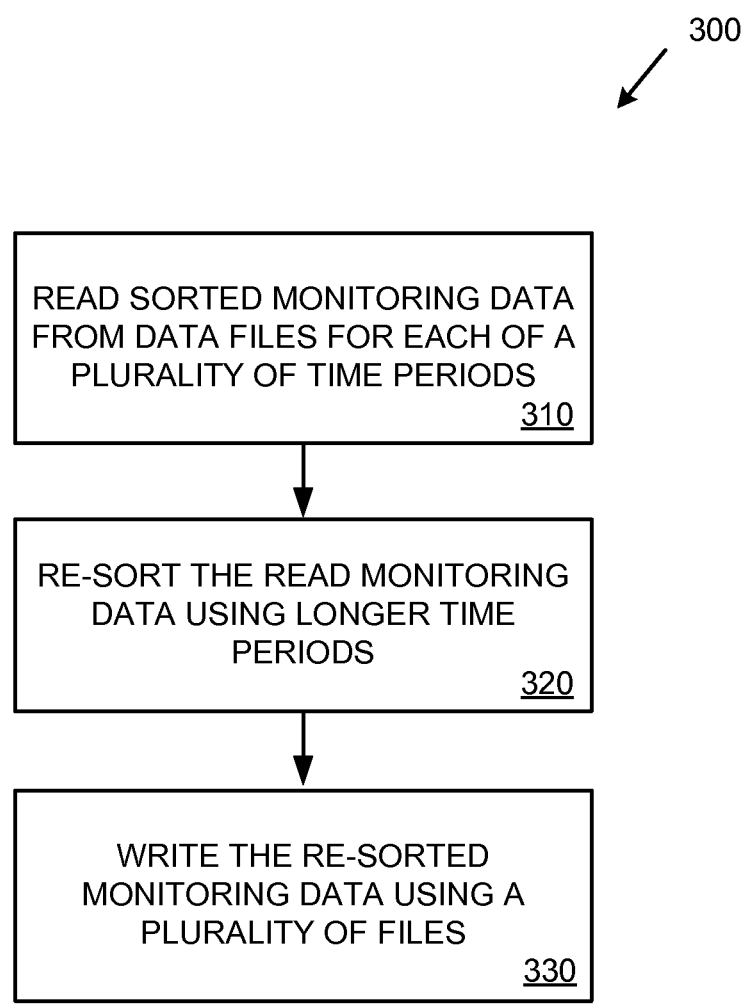
FIG. 3 is a flowchart of an example method for re-sorting monitoring data to use longer time periods.

FIG. 3 is a flowchart of an example method 300 for re-sorting monitoring data to use longer time periods. The method 300 can be performed, for example, by a multi-tenant monitoring system, such as multi-tenant monitoring system 110.

At 310, sorted monitoring data is read from data files for each of a plurality of time periods. The sorted monitoring data can be read from data files that are written using the method of FIG. 2 for each of a plurality of time periods. For example, monitoring data can be received, sorted, and written to data files for multiple tenants for each of a plurality of time periods (e.g., for each of a plurality of 10 second time periods).

At 320, the monitoring data that is read at 310 is re-sorted to use a longer time period (e.g., by combining the multiple time periods into a single time period having a time period length equal to the sum of the multiple time periods). For example, monitoring data for each tenant can be combined for the multiple time periods. For example, if there are three 10-second time periods, then the sorted monitoring data that is read for a particular tenant for each of the three 10-second time periods can be combined into sorted monitoring data for the particular tenant for a 30-second time period.

At 330, the re-sorted monitoring data is written using a plurality of files each of which stores re-sorted monitoring data for the longer time period. Each data file, of the plurality of data files storing re-sorted monitoring data, supports storing grouped data for a plurality of the multiple tenants.

Performing Pivot Queries Using Monitoring Data

In any of the embodiments described herein, pivot queries can be performed using monitoring data stored in data files. For example, a pivot query can be received from a tenant, monitoring data associated with the tenant can be read from data files (e.g., for one or more time periods), the read monitoring data can be aggregated (e.g., across one or more dimensions), and results can be output (e.g., displayed to the tenant, saved in a file, etc.).

Figure 4:
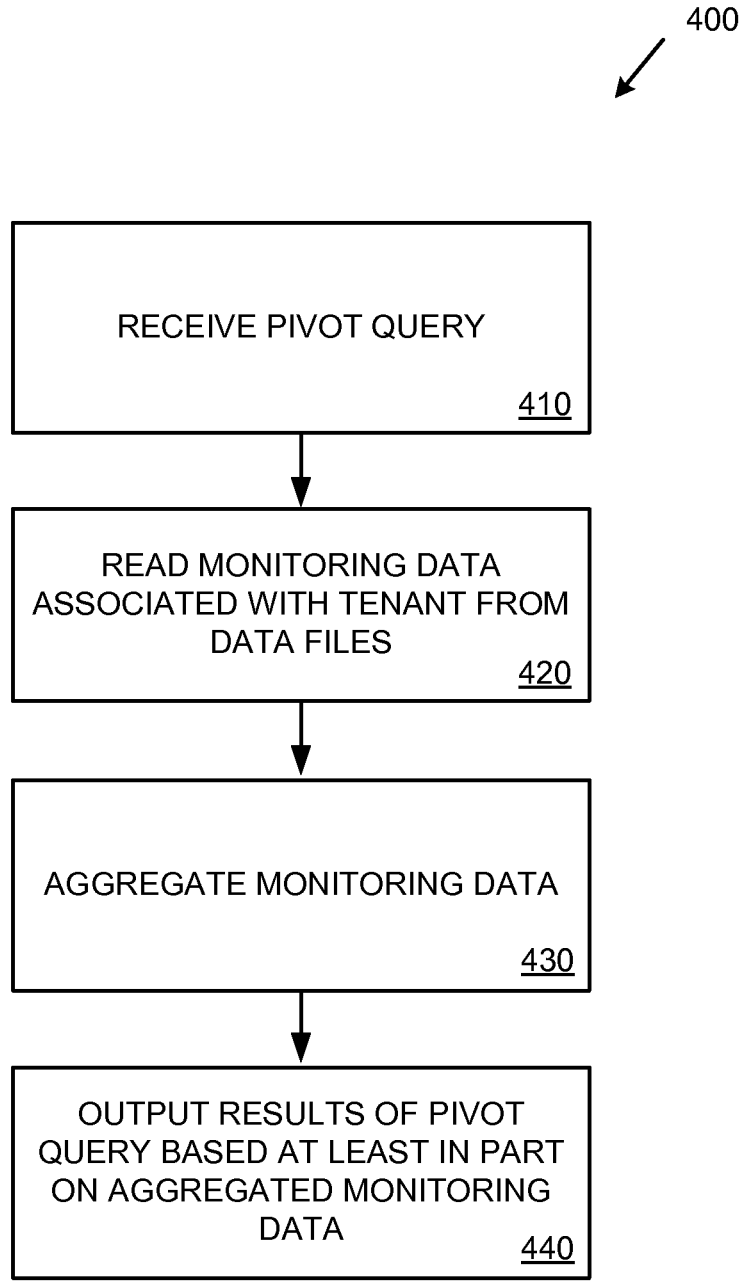
FIG. 4 is a flowchart of an example method for performing pivot queries using monitoring data.

FIG. 4 is a flowchart of an example method 400 for performing pivot queries using monitoring data. The method 400 can be performed, for example, by a multi-tenant monitoring system, such as multi-tenant monitoring system 110.

At 410, a pivot query is received from a tenant. For example, the pivot query can be received from the tenant via a web interface associated with a multi-tenant monitoring system. The pivot query can comprise an indication of which metric types are to be included in the query and how they are to be aggregated or otherwise processed (e.g., including an indication of one or more dimensions that the pivot query is to be performed across).

At 420, monitoring data for the tenant is read from one or more data files. The monitoring data can be read for each of a plurality of time periods from each of a corresponding set of data files. In some embodiments, the monitoring data for the tenant that is stored in the one or more data files is not aggregated or semi-aggregated, and is not indexed at a level of individual observations (e.g., other than an indication of which data file(s) contain the tenant's monitoring data).

Results of reading the monitoring data (e.g., some or all of the monitoring data, such as monitoring data associated with a particular customer and/or particular time periods) can be provided for aggregation. For example, the aggregation can be performed by a multi-tenant monitoring system and/or by other computing devices (e.g., results of reading the monitoring data can be provided by the multi-tenant monitoring system to a client-side system for aggregation and presentation of pivot query results).

At 430, the monitoring data that was read at 430 is aggregated. For example, the monitoring data can be aggregated for one or more metric types across one or more dimensions. The aggregation can be performed in a single pass.

At 440, results of the pivot query are output. For example, results of the aggregation and be presented to the tenant (e.g., in the form of graphs, tables, etc.).

The example method 400 can be performed in linear time. For example, the example method 400 can be performed by reading data files for one or more time periods, performing the aggregation in a single pass, and outputting the results in linear time regardless of the number or length of time periods for which the monitoring data is to be read.

Figure 5:
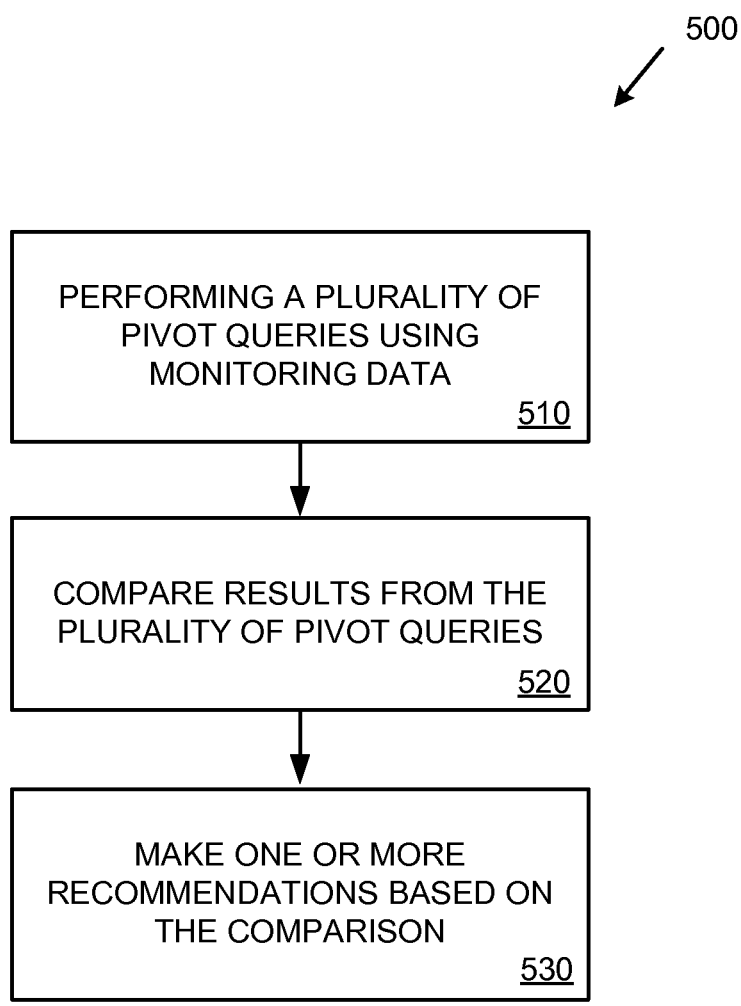
FIG. 5 is a flowchart of an example method for making recommendations based on pivot queries using monitoring data.

FIG. 5 is a flowchart of an example method 500 for making recommendations based on pivot queries using monitoring data. The method 500 can be performed, for example, by a multi-tenant monitoring system, such as multi-tenant monitoring system 110.

At 510, a plurality of pivot queries are performed using monitoring data. Each of the plurality of pivot queries can be performed using monitoring data from one or more time periods. Furthermore, each of the plurality of pivot queries can indicate one or more metric types and one or more dimensions.

At 520, results from performing the plurality of pivot queries are compared. For example, the plurality of pivot queries can be performed to measure performance (e.g., response time) for each of a plurality of web server components and/or version of the plurality of web server components. The results (e.g., response times) can then be compared to determine which component and/or version performs better (e.g., has the better response time).

At 530, one or more recommendations are made based on the comparison of results (from 520). For example, the one or more recommendations can include a recommendation to use a particular web server component (or a particular version of the particular component) which has a best relative response time (e.g., as compared to other components and/or versions).

Example Implementations for Storing and Re-Sorting Monitoring Data

Figure 6:
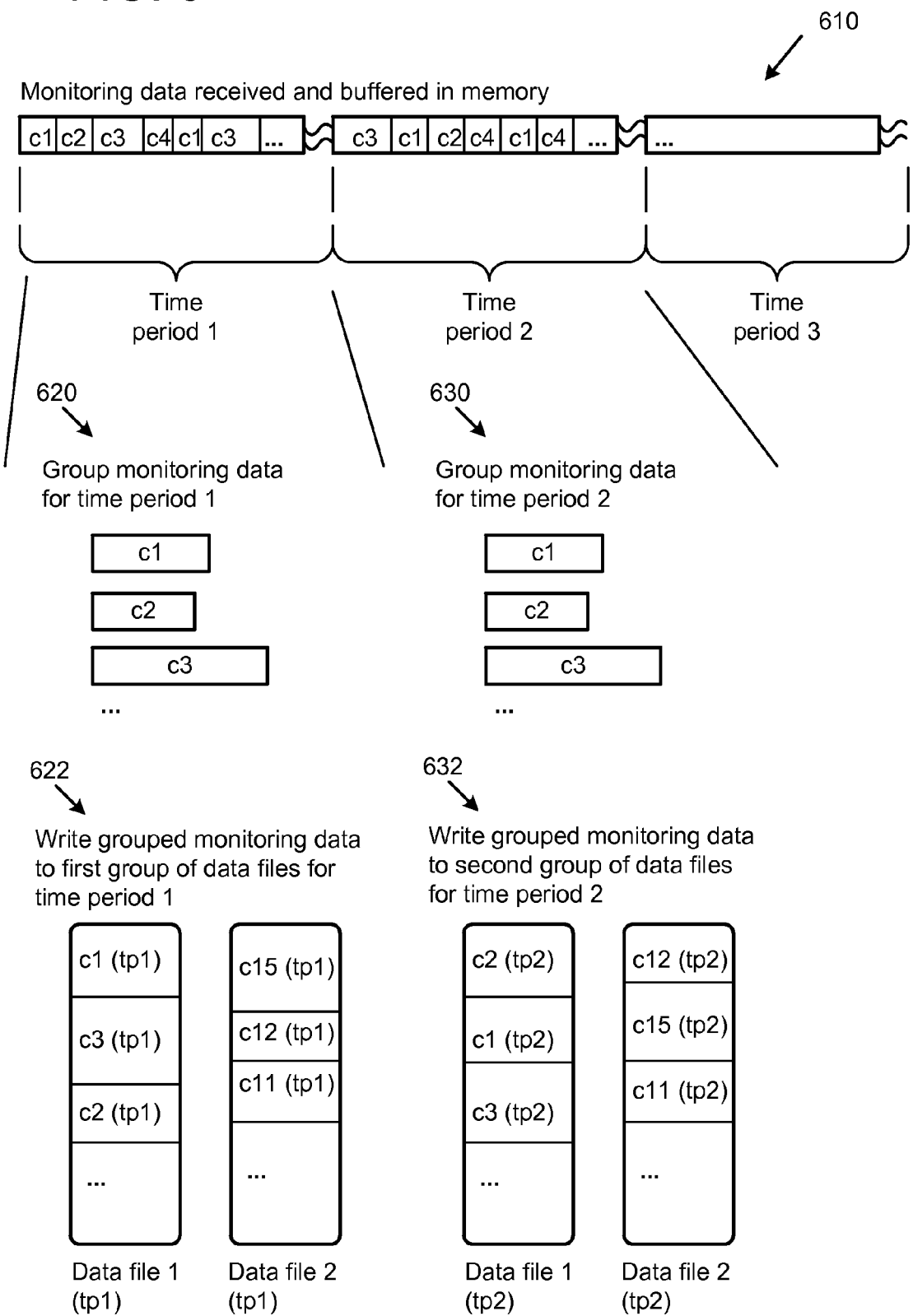
FIG. 6 is a diagram of an example implementation of storing grouped monitoring data in data files.

FIG. 6 is a diagram of an example implementation of storing grouped monitoring data in data files. For example, the operations depicted in FIG. 6 can be performed by a multi-tenant monitoring system, such as multi-tenant monitoring system 110.

As depicted at 610, monitoring data is received for a number of tenants (customers) from computing resources (e.g., from virtual computing resources associated with the tenants). The monitoring data is received from the computing resources and buffered in memory (e.g., RAM). For example, the monitoring data can be buffered in memory as it is received without any grouping being performed (e.g., without grouping each customer's data together memory).

As depicted at 610, monitoring data is being received and buffered in memory for a number of customers, some of which are labeled for illustration as customer 1 (c1) through customer 4 (c4). In general, monitoring data can be received and buffered for any number of customers (e.g., tens, hundreds, thousands or customers, or more). As depicted in the example implementation, during time period 1, monitoring data has been received and buffered for customer 1, customer 2, customer 3, and customer 4. Additional monitoring data has been received and buffered for customer 1, customer 3, and so on. As depicted, the monitoring data is being buffered as it is received (e.g., in the order it is received) without being grouped (e.g., separate receipts of monitoring data for a particular customer are not grouped in the memory).

As depicted at 610, monitoring data is received and buffered for each of a plurality of time periods, including time period 1, time period 2, time period 3, and so on. For example, each time period can be a number of seconds or minutes (e.g., 5 minutes). The length of the time period can be chosen, for example, to correspond to an amount of available memory (e.g., available RAM of a multi-tenant monitoring system).

Once monitoring data has been received for a time period, it is grouped and written to storage. For example, at the end of time period 1 (e.g., a 5-minute monitoring period), the monitoring data that has been received and buffered in memory is grouped, as depicted at 620. In this example implementation, grouping is performed by customer. As depicted at 620, the monitoring data received during time period 1 for customer 1 is grouped together, the monitoring data received during time period 1 for customer 2 is grouped together, the monitoring data received during time period 1 for customer 3 is grouped together, and so on for the remaining customers for which monitoring data was received and buffered during time period 1. The monitoring data can also be grouped based on other criteria, such as by metric type (e.g., sub-grouped by metric type within each customer).

Once the monitoring data for time period 1 has been grouped, it is written to a first group of data files for storage. As depicted at 622, the grouped monitoring data for customer 1 for time period 1 (c1, tp1) is written to a first data file along with grouped monitoring data for customer 2, customer 3, and so on until data file 1 is full. For example, each data file can be of the same size (e.g., 2 MB). Once data file 1 is full, grouped monitoring data for additional customers for time period 1 is written to additional files. For example, the first group of data files storing monitoring data for time period 1 can include a first data file storing grouped monitoring data for customers 1 through 10, a second data file storing grouped monitoring data for customers 11 through 25, and so on until all customers' monitoring data has been stored.

As depicted at 622, the grouped monitoring data within a particular data file does not have to be ordered. For example, within data file 1 for time period 1, the grouped monitoring data for customer 1 is located first in the file, followed by grouped monitoring data for customer 3, which is followed by grouped monitoring data for customer 2, and so on. In this manner, grouped monitoring data can be quickly and efficiently written to data files. For example, in some embodiments the only information that is maintained is which customer's monitoring data is in what data file (e.g., data file 1 for time period 1 contains data for customers 1 through 10, data file 2 for time period 1 contains data for customers 11 through 25, and so on). If the monitoring data needs to be read later (e.g., to perform pivot queries), then the file (or files) containing a particular customer's data can be read and that customer's grouped data can be located within the file (e.g., headers can be located within the file indicating the start and/or stop position of each customer's grouped data). In other embodiments, some additional index information can be maintained (e.g., index information indicating the location of each customer's data within each data file). However, in these other embodiments, the monitoring data stored in the data files is not indexed at a level of individual observations (individual metric values or individual data points).

The process of grouping monitoring data and writing grouped monitoring data to data files is repeated for time period 2 using a second set of data files (different from the first set of data files depicted at 622), as depicted at 630 and 632, and then for any future time periods (e.g., time period 3 and beyond).

In some embodiments, the monitoring data is received (e.g., as depicted at 610), grouped (e.g., as depicted at 620 and 630), and written to data files (e.g., as depicted to 622 and 632) without being aggregated across dimensions. By storing un-aggregated or semi-aggregated monitoring data (e.g., individual metric values and associated meta-data), a customer can later decide which data to aggregate (e.g., across one or more dimensions) when performing pivot queries. For example, in some embodiments some aggregation may be performed within the current time period being written to the data files, but no aggregation is performed across one or more dimensions that can later be selected by the pivot query (e.g., if region and software version are dimensions that can be selected by the pivot query, then region and software version will not be aggregated when written to the data files).

The order that customers' grouped monitoring data is written to data files may or may not be the same from time period to time period. For example, if grouped monitoring data is not ordered (e.g., not ordered by customer number or other customer identifier) during a first time period (e.g., a 5 minute period), a first data file for the time period may contain monitoring data for customer 20, customer 15, custom 32, etc., and during a second time period (e.g., the next 5 minute period), a first data file for the second time period may contain monitoring data for customer 42, customer 5, customer 12, etc. Furthermore, in some embodiments customers may have different amounts of monitoring data from time period to time period and new customers may be added or removed from monitoring.

Figure 7:
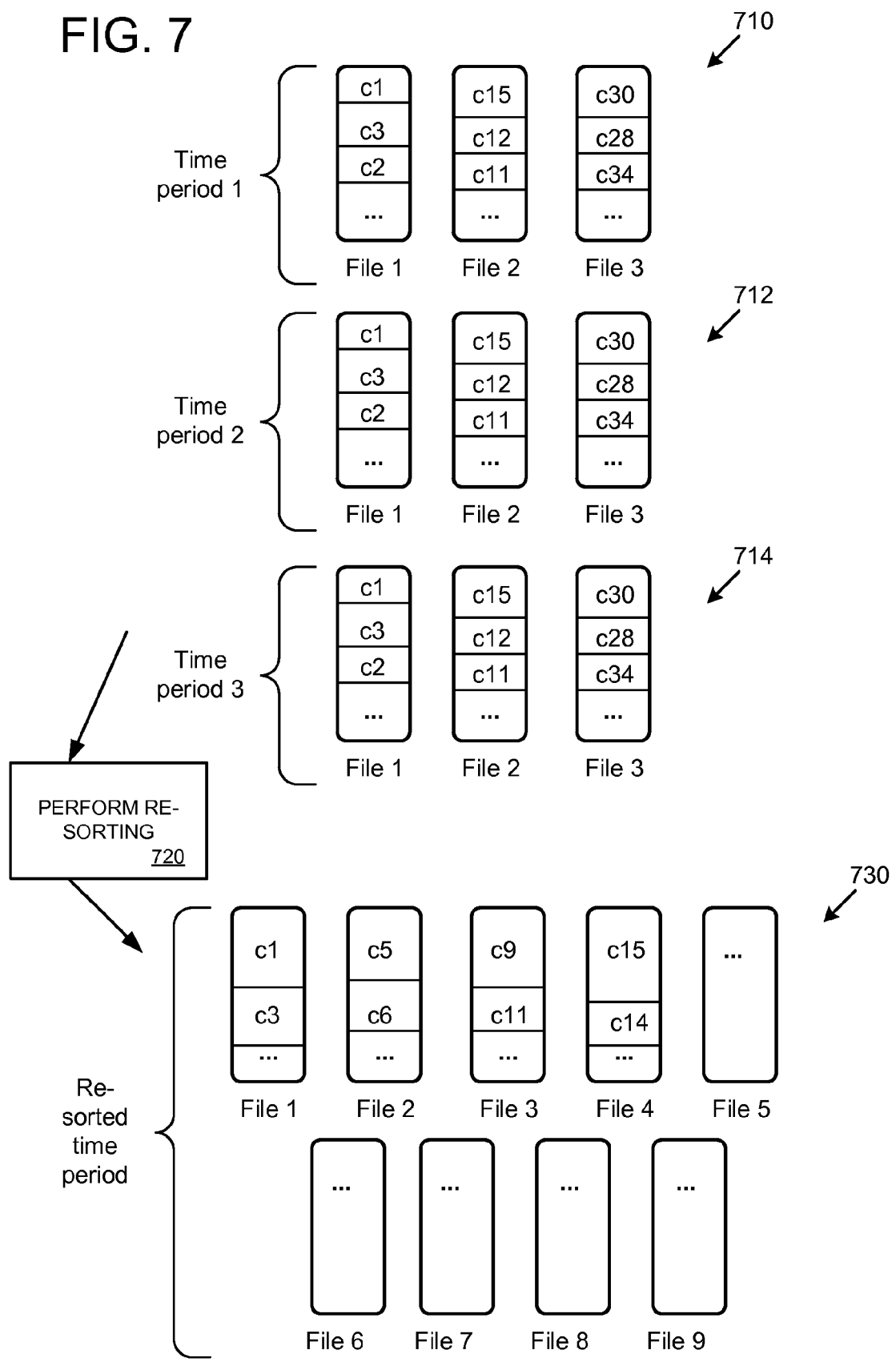
FIG. 7 is a diagram of an example implementation of re-sorting monitoring data stored in data files.

FIG. 7 is a diagram of an example implementation of re-sorting monitoring data stored in data files. As depicted in the example implementation, there three sets of data files, 710, 712, and 714. Each set of data files stores grouped monitoring data for a time period (time periods 1 through 3). For example, the first set of data files 710 can store grouped monitoring data for a first 5-minute time period, the second set of data files 712 can store grouped monitoring data for a second 5-minute time period (following the first time period), and the third set of data files 714 can store grouped monitoring data for a third 5-minute time period (following the second time period).

In order to perform re-sorting 720 of the stored monitoring data to use a longer time period, the stored monitoring data is read from the data files (710, 712, and 714), the monitoring data is combined to use fewer time periods, and then it is written back to data files (e.g., using the same number of data files of the same size, or using a different number of data files of a different size). In the example implementation, the monitoring data for the three time periods is combined into one time period (e.g., if the three time periods are 5 minutes each, then the new time period would be 15 minutes).

To illustrate operation of the re-sorting 720, the monitoring data for customer 1 (c1) is read from data files for each of the three time periods (710, 712, and 714). Then, the monitoring data for customer 1 is combined (e.g., three 5-minute time periods of monitoring data for customer 1 are combined into a single group representing one 15-minute time period of monitoring data for customer 1) and written to a data file of a set of data files storing monitoring data for the new time period (e.g., a 15-minute time period), as depicted at 730.

When the monitoring data for a customer is combined over multiple time periods, it takes up more storage space. If the new data files used to store the re-sorted monitoring data are the same size as the original files, then each of the new data files will store re-sorted monitoring data for a fewer number of customers, but for a longer period of time. For example, the first data file for each of the original time periods (710, 712, and 714) may store grouped monitoring data for 10 customers (e.g., customers 1 through 10). Once the monitoring data has been read and grouped to use the longer time period, the first data file storing the re-sorted monitoring data may store grouped monitoring data for 3 or 4 customers (as illustrated at 730).

Example Implementations for Zero Setup of Monitoring Data

In any of the embodiments described herein, monitoring data can be sent, received, stored, and accessed with minimal setup that supports arbitrarily-defined pivot queries. For example, customers (e.g., users or developers of a computing environment that provides virtual computing resources) can send monitoring data to be stored (e.g., stored by a multi-tenant monitoring system in data files) without the customers having to perform any setup ahead-of-time (e.g., setup to indicate which metric types will be sent for storage, which dimensions will be included, etc.). Furthermore, customers can perform zero setup pivot queries using such stored monitoring data. For example, users can perform zero-setup or arbitrarily-defined pivot queries using any available stored information (e.g., metric types, dimensions, and/or other meta-data) without any setup needed ahead-of-time (e.g., without specifying which aggregates should be pre-computed).

For example, consider a customer that is operating a large web site that is served by multiple web servers (e.g., multiple virtual server instances). At first, the customer may decide to send monitoring data to a monitoring system (e.g., a multi-tenant monitoring system) that only includes CPU utilization for each web server (e.g., where each server is identified by unique server identifier meta-data). Later, the customer may decide to include additional metric types and/or meta-data in the monitoring data. For example, the customer may decide to also include location meta-data (e.g., geographical region) and/or software version meta-data along with the CPU utilization and server identifier.

Regardless of what information the monitoring data includes (e.g., which metric types, which meta-data, etc.), the monitoring data can be efficiently stored for later use during pivot queries. For example, monitoring data can be received (e.g., by a multi-tenant monitoring system), grouped (e.g., customer), and stored (e.g., in data files). The monitoring data can be received, grouped, and stored without performing any aggregation across any dimensions (e.g., without pre-aggregation). Furthermore, the monitoring data can include any desired metric types and any desired meta-data. The included metric types and meta-data can vary over time and vary between customers (e.g., as there is no pre-defined schema).

As a further example, consider a scenario in which a customer is operating a large web site that is served by three web servers (e.g., three virtual server instances) where each web server is managed or developed by a different person. The first person managing the first web server may decide to send (e.g., to a multi-tenant monitoring system) monitoring data including CPU utilization, location (e.g., the state in which the web server is located), and a server identifier for the first web server. The second person managing the second web server may decide to send (e.g., to the multi-tenant monitoring system) monitoring data including CPU utilization, software version of the web server software, and a server identifier for the second web server. The third person managing the third web server may decide to send (e.g., to the multi-tenant monitoring system) monitoring data including CPU utilization, instance type (e.g., that the third virtual server instance is a large type instance), and a server identifier for the third web server. The monitoring system (e.g., the multi-tenant monitoring system) that receives the monitoring data from each of the three web servers can group the monitoring data together (e.g., because it is all associated with the same customer) and store the grouped monitoring data in data files (e.g., using separate sets of data files for each of a plurality of time periods). Furthermore, each person may decide to include different monitoring data over time (e.g., the person managing the second web server may decide to also include location meta-data at some point).

Monitoring data can be sent, received, and stored in any type of data format. For example, monitoring data can be sent, received, and stored using a list of key-value pairs. The below table (Table 1) depicts an example of key-value monitoring data that can be sent, received, and/or stored for the three web servers described in the above example monitoring scenario.

TABLE 1

| Timestamp (e.g., data/time) | Monitoring Data - Key-Value Pairs |
| --- | --- |
| t1 | (ServerID, 1), (CPU, 35%), (Location, WA) |
| t2 | (ServerID, 2), (CPU, 6%), (Version, 3.0) |
| t3 | (ServerID, 3), (CPU, 18%), (Type, large) |
| t4 | (ServerID, 1), (CPU, 33%), (Location, WA) |
| t5 | (ServerID, 2), (CPU, 7%), (Version, 3.0) |
| t6 | (ServerID, 3), (CPU, 12%), (Type, large) |
| t7 | (ServerID, 1), (CPU, 32%), (Location, WA) |
| t8 | (ServerID, 2), (CPU, 7%), (Version, 3.0), (Location, CA) |
| t9 | (ServerID, 3), (CPU, 15%), (Type, large) |

In the example monitoring data depicted in Table 1 above, nine instances of key-value monitoring data is listed. For example, the nine instances can be received by a multi-tenant monitoring system from the web servers (web servers with server identifiers 1, 2, and 3 in this example) during a particular monitoring period (e.g., during a one-minute monitoring period). As illustrated by the example monitoring data in Table 1, the monitoring data for server 2 has been changed during the monitoring period to also include location.

Monitoring data that has been stored can then be used for performing pivot queries that require zero setup. Pivot queries can be performed by filtering on any available metric types and aggregating across any available dimensions for one or more time periods. For example, the monitoring data for a particular customer can be read (e.g., for one or more time periods) and analyzed to determine which metric types and dimensions are available. Additional dimensions may also be available (e.g., always present dimensions such as regions or instance types). The customer can then perform pivot queries dynamically based (e.g., at query time) on the available metric types and dimensions, and meta-data can be added at query time. For example, the customer can be presented with available metric types, dimensions, and other information from which the customer can select when performing the query. Furthermore, the available metric types, dimensions, and other information can vary from time period to time period, from server to server, etc.

Using the above example monitoring scenario of the three web servers, the customer can be presented with available metric types and dimensions for each of the three servers. Using this example, the customer can perform pivot queries based on CPU utilization for all three web servers, as the CPU utilization metric type was stored for all three web servers. The customer can perform pivot queries for the first web server based on location, separately or in combination with CPU utilization. The customer can perform pivot queries for the second web server based on software version, separately or in combination with CPU utilization. The customer can perform pivot queries for the third web server based on instance type, separately or in combination with CPU utilization. Furthermore, if location was also stored for the second web server for a particular time period, then the customer could perform pivot queries for both the first and second web servers based on location for at least those time periods (e.g., separately or in combination with CPU utilization).

Figure 8:
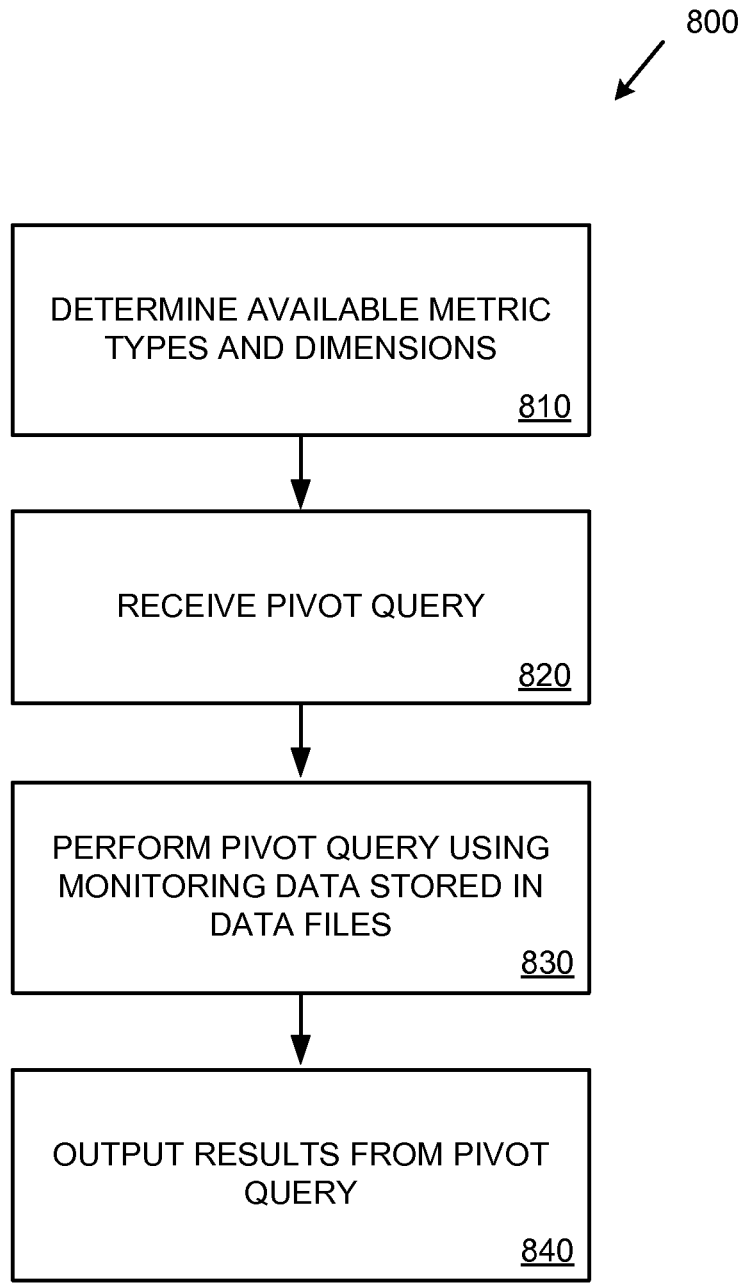
FIG. 8 is a flowchart of an example method for performing a zero setup pivot query using monitoring data.

FIG. 8 is a flowchart of an example method 800 for performing a zero setup pivot query using monitoring data. The method 800 can be performed, for example, by a multi-tenant monitoring system, such as multi-tenant monitoring system 110.

At 810, available metric types and dimensions are determined. The metric types and dimensions are determined to be available for use when pivot querying monitoring data (e.g., monitoring data stored in data files for one or more time periods). For example, monitoring data can be read to determine which metric types and/or dimensions are present in the stored monitoring data (e.g., a list of available metric types and/or dimensions can be accumulated). Alternatively, available metric types and dimensions can be determined in another way (e.g., by retrieving a list of available metric types and dimensions associated with, but stored separately from, monitoring data for one or more time periods). Available metric types and dimensions can be presented to a customer. For example, the customer can view, or select from, presented metric types and dimensions when deciding how to formulate a pivot query.

At 820, a pivot query is received (e.g., from a customer using a multi-tenant monitoring system). The pivot query can indicate one or more metric types (e.g., as filters) and/or one or more dimensions (e.g., for performing aggregation) that are based at least in part on the available metric types and dimensions determined at 810. The pivot query requires zero setup. For example, a user can arbitrarily define the pivot query at query time to include any available metric types and/or dimensions without any setup required ahead-of-time (e.g., without pre-computation of aggregates).

At 830, the pivot query is performed using monitoring data stored in data files. For example, the pivot query can be performed by reading monitoring data for one or more time periods and performing filtering and/or aggregation according to the metric types and/or dimensions indicated by the pivot query.

At 840, results of the pivot query are output. For example, results of the aggregation can be presented to the customer (e.g., in the form of graphs, tables, etc.).

Example Implementations for Performing Pivot Queries

In any of the embodiments described herein, pivot queries can be performed on monitoring data. For example, a customer of a multi-tenant monitoring system can submit pivot queries to be processed by the multi-tenant monitoring system. The multi-tenant monitoring system can read monitoring data (e.g., for one or more time periods), perform aggregation (e.g., aggregate based on metric types, based on aspects such as geographical region, instance type, request type, API type, and/or based on other dimensions of the monitoring data and associated meta-data), and present results to the customer (e.g., in the form of tables, graphs, charts, etc.).

For example, customers may want to have more flexibility when analyzing monitoring data comprising various metric types and associated meta-data reflecting performance of their computing resources. For example, customers can use the technologies described herein (e.g., implemented within a multi-tenant monitoring system) to perform dimension pivots which take one or more metrics (e.g., CPU utilization across many servers), which may be over one or more time periods, and group, filter, and/or aggregate them across one or more dimensions (e.g., a dimension such as server instance type or geographical region). As another example, customers can use the technologies described herein to perform a "top N" analysis to show the top N values or the top N metrics for a time window over a group of metrics (or many time windows over a single metric). Customers can also perform other types of analysis of monitoring data using the technologies described herein, such as percentile analysis (e.g., show distribution of metric values across percentiles for one or more metrics and/or one or more time windows), prediction analysis (e.g., predict future values over time for a metric or set of metrics), and anomaly detection analysis (e.g., detect when a metric or group of metrics is abnormal and merits attention).

Customers can use the technologies described herein to meet their reactive and proactive needs (e.g., by performing pivot queries using a multi-tenant monitoring system). For example, reactive needs can include discovering there is a problem, localizing the source of the problem, and determining whether the problem has been resolved after a change has been made. Proactive needs can include preventing problems that may (or will) occur if action is not taken, capturing new opportunities, projecting future workload, understanding how usage patterns change over time, etc.

The following is an example scenario of how the technologies described herein can be used within a multi-tenant monitoring system. In this example scenario, a customer is monitoring CPU utilization across a group of virtual server instances spread across a number of geographical regions where the virtual server instances serve a web site. The customer has noticed that the web site is not performing as expected and runs a pivot query using the multi-tenant monitoring system. Specifically, the customer runs a pivot query to view CPU utilization (average and top 3) aggregated over 5-minute intervals for the last hour across virtual server instances across all geographical regions. The following table (Table 2) depicts example results from the pivot query (note that only some of the data values are depicted for ease of illustration).

TABLE 2

| CPU Utilization (%) | Now-60 min | Now-55 min | ... | Now (last 5 min) |
|---|---|---|---|---|
| Average | 20% | 21% | ... | 22% |
| Top 1 | Inst5 (West1) 80% | Inst7 (West1) 84% | ... | Inst4 (West1) 94% |
| Top 2 | ... | ... | ... ... | |
| Top 3 | ... | ... | ... ... | |

As the customer can see from Table 2, there are some virtual server instances that have CPU utilization much higher than the average (e.g., instance 5 in the West 1 region had 80% CPU utilization during the 5-minute interval 60 minutes ago (Now-60)). The customer can see that the problem is still present (e.g., instance 4 in the West 1 region had 94% CPU utilization in the last 5-minute interval ending at the present time (Now)).

The customer could then run a pivot query to view CPU utilization (average and top 3) aggregated over 5-minute intervals for each region to see how the problem is affecting virtual servers in different geographical regions. The following table (Table 3) depicts example results from the pivot query (note that only some of the data values are depicted for ease of illustration).

TABLE 3

| CPU Utilization (%) | Now-60 min | Now-55 min | ... | Now (last 5 min) |
|---|---|---|---|---|
| Region - West1 | | | | |
| Average | 20% | 23% | ... | 26% |
| Top 1 | Inst5 (West1) 80% | Inst7 (West1) 84% | ... | Inst4 (West1) 94% |
| ... | ... | ... | ... ... | |
| Region - West2 | | | | |
| Average | 20% | 20% | ... | 19% |
| Top 1 | Inst1 (West2) 30% | Inst4 (West2) 29% | ... | Inst3 (West2) 25% |
| ... | ... | ... | ... ... | |
| Region - East1 | | | | |
| Average | 18% | 17% | ... | 19% |
| Top 1 | Inst2 (East1) 28% | Inst5 (East1) 29% | ... | Inst4 (East1) 23% |
| ... | ... | ... | ... ... | |

As the customer can clearly see from Table 3, virtual servers in the West 1 region have CPU utilization much higher than the average and much higher than the other regions. The customer can also see that virtual server instances in the other regions have a relatively normal CPU utilization in comparison to the average.

In order to obtain a different perspective on the results, the customer can pivot to display the time intervals (5-minute intervals in this example) as rows and regions as columns. The following table (Table 4) depicts example results from the pivot query (note that only some of the data values are depicted for ease of illustration).

TABLE 4

| CPU Utilization (%) | Region - West1 | Region - West2 | Region - East1 | ... |
|---|---|---|---|---|
| Now-60 min | | | | |
| Average | 20% | 20% | 18% | ... |
| Top 1 | Inst5 (West1) 80% | Inst1 (West2) 30% | Inst2 (East1) 28% | ... |
| ... | ... | ... | ... | ... |
| Now-55 min | | | | |
| Average | 23% | 20% | 17% | ... |
| Top 1 | Inst7 (West1) 84% | Inst4 (West2) 29% | Inst5 (East1) 29% | ... |
| ... | ... | ... | ... | ... |
| Now (last 5 min) | | | | |
| Average | 26% | 19% | 19% | ... |
| Top 1 | Inst4 (West1) 94% | Inst3 (West2) 25% | Inst4 (East1) 23% | ... |
| ... | ... | ... | ... | ... |

The customer can also aggregate the monitoring data based on different metric types. For example, the customer can switch the pivot query that was used to generate the results depicted in Table 3 to aggregate based on a memory utilization metric type (instead of CPU utilization). The following table (Table 5) depicts example results from the pivot query (note that only some of the data values are depicted for ease of illustration).

TABLE 5

| Memory Used (GB) | Now-60 min | Now-55 min | ... | Now (last 5 min) |
|---|---|---|---|---|
| Region - West1 | | | | |
| Average | 2.0 GB | 2.0 GB | ... | 2.0 GB |
| Top 1 | Inst5 (West1) 3.6 GB | Inst7 (West1) 3.6 GB | ... | Inst4 (West1) 3.6 GB |
| ... | ... | ... | ... ... | |
| Region - West2 | | | | |
| Average | 1.6 GB | 1.6 GB | ... | 1.6 GB |
| Top 1 | Inst3 (West2) 2.0 GB | Inst4 (West2) 1.9 GB | ... | Inst3 (West2) 2.1 GB |
| ... | ... | ... | ... ... | |
| Region - East1 | | | | |
| Average | 1.5 GB | 1.6 GB | ... | 1.6 GB |
| Top 1 | Inst3 (East1) 1.9 GB | Inst2 (East1) 1.9 GB | ... | Inst4 (East1) 2.0 GB |
| ... | ... | ... | ... ... | |

As the customer can see from Table 5, the virtual servers in the West 1 region also have higher memory utilization than the average, and a higher utilization than the other regions.

The customer may then want to determine how long the problem has been going on. To do this, the customer can run a pivot query to view CPU utilization (average and top 3) aggregated over 1-hour intervals for just the West 1 region. The following table (Table 6) depicts example results from the pivot query (note that only some of the data values are depicted for ease of illustration).

TABLE 6

| CPU Utilization (%) | ... | Now-2 hours | Now-1 hour | Now (last hour) |
|---|---|---|---|---|
| Region - West1 | | | | |
| Average | ... | 19% | 20% | 26% |
| Top 1 | ... | Inst7 (West1) 32% | Inst9 (West1) 35% | Inst4 (West1) 94% |
| Top 2 | ... ... | ... | ... | |
| Top 3 | ... ... | ... | ... | |

From the example results depicted in Table 6, the customer can determine that the increased CPU utilization occurred within the last hour. From this information, the customer could determine, for example, that the cause is due to a recent deployment of a new version of a web server component that was installed on the virtual server instances of the West 1 region about an hour ago (e.g., and roll-back the component installation in the West 1 region to resolve the problem).

The customer can perform the example pivot queries discussed above with regard to Tables 2 through 6 using the multi-tenant monitoring system technologies described herein. Furthermore, the customer can perform these example pivot queries in linear time. For example, the example pivot queries can be performed by reading a predictable number of data files (e.g., one or more data files associated with the customer for each 5-minute period or for each 1-hour period, which could be a period that was re-sorted), performing aggregation for the desired metric type (or metric types) and for one or more dimensions (e.g., aggregation of CPU utilization for each virtual server across each region), and presenting results (e.g., in the format of a table, as depicted, or in another format, such as a graph). For example, a single aggregation pass can be performed to aggregate for the desired metric types and/or dimensions. In addition, because the monitoring data maintains individual metric values, aggregation can be performed for any desired metric type (or metric types) across any desired dimension (or dimensions) for which metric values and meta-data has been stored.

Server Environment Supporting a Multi-Tenant Monitoring System

In any of the embodiments described herein, a multi-tenant monitoring system can be included as part of an environment providing virtual computing resources (e.g., as part of a cloud computing environment providing virtual computing resources to customers). The multi-tenant monitoring system can be provided for receiving monitoring data, sorting the received monitoring data, and writing the sorted monitoring data to data files. The multi-tenant monitoring system can also be provided for serving pivot queries, including reading stored monitoring data, aggregating along one or more dimensions, and presenting results to customers.

Figure 9:
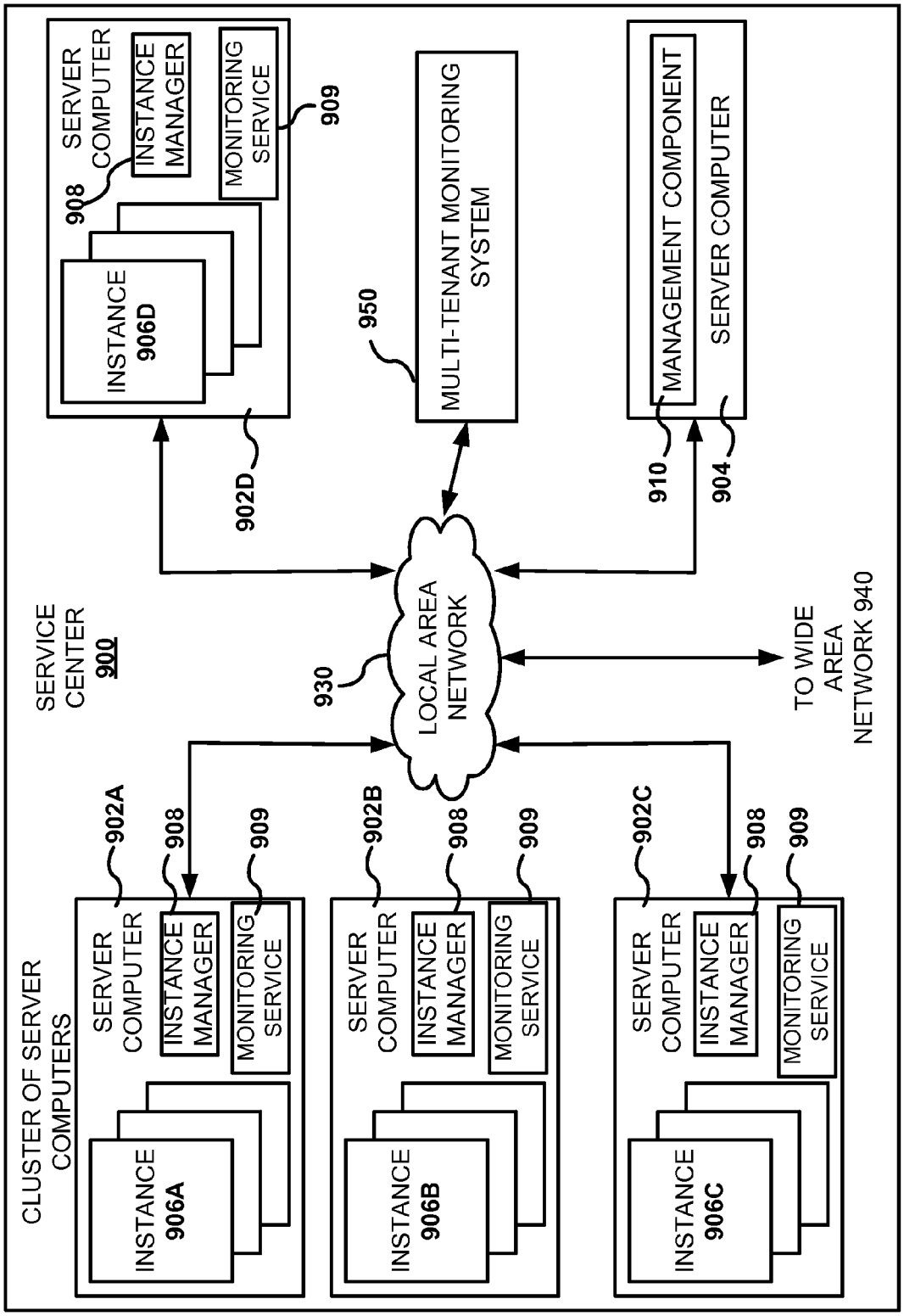
FIG. 9 is an example system diagram showing a network-based service center including a multi-tenant monitoring system.

FIG. 9 is a computing system diagram of a network-based service center 900 that illustrates one configuration that can be used for the embodiments described herein. By way of background, the service center 900 is capable of delivery of computing and storage capacity as a service to a community of end recipients. Generally speaking, the service center 900 can provide the following models: infrastructure as a service, platform as a service, and/or software as a service. Other models can be provided. For the infrastructure as a service model, the service center 900 can offer computers as physical or virtual machines and other resources. The virtual machines can be run as guests by a hypervisor, as described further below. The platform as a service model delivers a computing platform can include an operating system, programming language execution environment, database, and web server. Application developers can develop and run their software solutions on the service center platform without the cost of buying and managing the underlying hardware and software. The software as a service model allows installation and operation of application software in the service center. In some embodiments, end users access the service center 900 using networked client devices, such as desktop computers, laptops, tablets, smartphones, etc. running web browsers or other lightweight client applications. Those skilled in the art will recognize that the service center 900 can be described as a "cloud" environment.

The particular illustrated service center 900 includes a plurality of server computers 902A-902D. While only four server computers are shown, any number can be used, and large centers can include thousands of server computers. The server computers 902A-902D can provide computing resources for executing software instances 906A-906D. In one embodiment, the instances 906A-906D are virtual machine instances. As known in the art, a virtual machine instance is an instance of a software implementation of a machine (i.e. a computer) that executes applications like a physical machine. In the example of virtual machine instances, each of the servers 902A-902D can be configured to execute an instance manager 908 capable of executing the instances. The instance manager 908 can be a hypervisor or another type of program configured to enable the execution of multiple instances 906 on a single server. Additionally, each of the instances 906 can be configured to execute one or more applications.

Each of the server computers 902 can have an associated monitoring service 909. The monitoring service 909 can obtain instance-specific monitoring data (e.g., monitoring data for one or more metric types) and associated metadata, such as an customer information, software information (e.g., software component and version information), instance type, MAC address, geographic region in which the software application instance is executing, etc. Although shown locally on the server computers 902, the monitoring service 909 can be positioned on a separate server (e.g., a centralized monitoring server, such part of the multi-tenant monitoring system 950).

It should be appreciated that although the embodiments disclosed herein are described primarily in the context of virtual machine instances, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

A server computer 904 can be reserved for executing software components for managing the operation of the server computers 902 and the instances 906. For example, the server computer 904 can execute a management component 910 (e.g., a management service). A customer can access the management component 910 to configure various aspects of the operation of the instances 906 purchased by the customer. For example, the customer can purchase, rent or lease instances and make changes to the configuration of the instances. The customer can also specify settings regarding how the purchased instances are to be scaled in response to demand.

The service center 900 can also include a multi-tenant monitoring system 950. The multi-tenant monitoring system 950 can receive monitoring data (e.g., from the monitoring services 909), sort the received monitoring data (e.g., to group by customer), and write the sorted monitoring data to data files. The multi-tenant monitoring system 950 can also serve pivot queries, including reading stored monitoring data, performing aggregation (e.g., based on one or more metric types, meta-data, and/or other aspects), and presenting results (e.g., presenting tables or graphs to customers running the pivot queries). The multi-tenant monitoring system 950 can be used by customers of the service center 900 to perform proactive and reactive tasks (e.g., to monitor performance of computing resources, predict future performance, diagnose problems, etc.).

A network 930 can be utilized to interconnect the server computers 902A-902D, the server computer 904, and the multi-tenant monitoring system 950. The network 930 can be a local area network (LAN) and can be connected to a Wide Area Network (WAN) 940 so that end users can access the service center 900. It should be appreciated that the network topology illustrated in FIG. 9 has been simplified and that many more networks and networking devices can be utilized to interconnect the various computing systems disclosed herein.

Example Computing Systems

Figure 10:
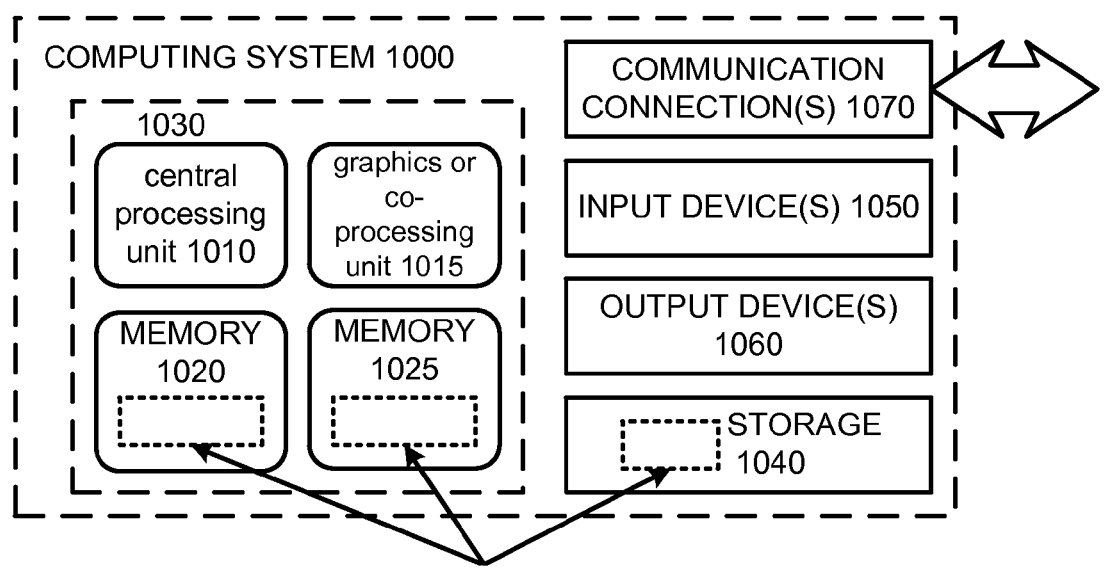
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), nonvolatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include communication connections (e.g., 1070) such as signals and carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A method, implemented at least in part by a multi-tenant monitoring system comprising one or more computing devices, for storing monitoring data for use during pivot querying, the method comprising:

for each of a plurality of time periods each having a first time period length:

receiving, by the multi-tenant monitoring system, monitoring data for multiple tenants;

sorting, by the multi-tenant monitoring system, the received monitoring data, wherein the sorting comprises grouping the received monitoring data by each tenant of the multiple tenants; and writing, by the multi-tenant monitoring system, the sorted monitoring data, wherein the sorted monitoring data is written to storage using a plurality of data files, and wherein each of the data files supports storing data for a plurality of the multiple tenants;

wherein the sorted monitoring data that is written to storage is not aggregated across dimensions.

2. The method of claim 1 wherein sorting the received monitoring data comprises:

further grouping the received monitoring data by at least one dimension within the grouped monitoring data of one or more of the multiple tenants.

3. The method of claim 1 wherein the monitoring data stored within the plurality of data files is not indexed at a level of individual observations.

4. The method of claim 1 wherein each time period of the plurality of time periods uses a new plurality of data files.

5. The method of claim 4 further comprising, after the receiving, sorting, and writing have been performed for each of the plurality of time periods:

for each of the plurality of time periods, reading the sorted monitoring data from the plurality of data files;

re-sorting the read monitoring data comprising combining sorted monitoring data to use fewer time periods having a second time period length longer than the first time period length; and writing the re-sorted monitoring data, wherein the re-sorted monitoring data is written to storage using a plurality of data files each storing re-sorted monitoring data for the second time period, and wherein each data file, of the plurality of data files storing re-sorted monitoring data, supports storing grouped data for a plurality of the multiple tenants.

6. The method of claim 1 wherein the received monitoring data is unsorted.

7. The method of claim 1 wherein the multi-tenant monitoring system is configured to read the stored monitoring data, aggregate the read data monitoring data, and perform pivot queries using the aggregated monitoring data.

8. The method of claim 1 wherein receiving the monitoring data comprises;

buffering the monitoring data in random access memory (RAM) for a period of time, wherein the period of time is based at least in part upon an amount of available RAM.

9. The method of claim 1 further comprising:

scaling out the multi-tenant monitoring system comprising partitioning the multiple tenants among a plurality of groups of computing resources.

10. A monitoring system comprising one or more computing devices for storing data for use during pivot querying, the monitoring system comprising:

one or more systems comprising processing units, memory, and file storage;

the one or more systems configured to perform operations for storing data for use during pivot querying, the operations comprising:

receiving data associated with multiple sources;

sorting the received data; and writing the sorted data, wherein the sorted data is written to storage using a plurality of data files, and wherein each of the data files supports storing data for a plurality of the multiple sources;
wherein the sorted data that is written to storage is not aggregated across dimensions.

11. The monitoring system of claim 10 wherein sorting the received data comprises:
grouping the received data by each source of the multiple sources.

12. The monitoring system of claim 10 wherein individual data points of the data stored within the plurality of data files are not indexed.

13. The monitoring system of claim 10 wherein the receiving, the sorting, and the writing are performed for each of a plurality of time periods, wherein each time period of the plurality of time periods is of a first time period length, and wherein each time period of the plurality of time periods uses a new plurality of data files.

14. The monitoring system of claim 13 further comprising, after the receiving, sorting, and writing have been performed for each of the plurality of time periods:
for each of the plurality of time periods, reading the sorted data from the plurality of data files;
re-sorting the read data comprising combining sorted data to use fewer time periods having a second time period length longer than the first time period length;
writing the re-sorted data, wherein the re-sorted data is written to storage using a plurality of data files each storing re-sorted data for the second time period, and wherein each data file, of the plurality of data files storing re-sorted data, supports storing grouped data for a plurality of the multiple sources.

15. The monitoring system of claim 10 wherein receiving the data comprises;
buffering the data in random access memory (RAM) for a period of time, wherein the period of time is based at least in part upon an amount of available RAM.

16. The monitoring system of claim 10 further comprising:
scaling out the monitoring system comprising partitioning the multiple sources among a plurality of groups of computing resources.

17. A computer-readable storage medium storing computer-executable instructions for causing one or more computing devices to perform a method for storing monitoring data for use during pivot querying, the method comprising:
receiving monitoring data for multiple tenants;
sorting the received monitoring data, wherein the sorting comprises grouping the received monitoring data by each tenant of the multiple tenants; and
writing the sorted monitoring data, wherein the sorted monitoring data is written to storage using a plurality of data files associated with the time period, and wherein each of the data files supports storing data for a plurality of the multiple tenants;
wherein the sorted monitoring data that is written to storage is not aggregated across dimensions.

18. The computer-readable storage medium of claim 17 wherein the monitoring data stored within the plurality of data files is not indexed at a level of individual observations.

19. The computer-readable storage medium of claim 17 wherein the receiving, the sorting, and the writing are performed for each of a plurality of time periods, wherein each time period of the plurality of time periods is of a first time period length, and wherein each time period of the plurality of time periods uses a new plurality of data files.

20. The computer-readable storage medium of claim 19, the method further comprising, after the receiving, sorting, and writing have been performed for each of the plurality of time periods:
for each of the plurality of time periods, reading the sorted monitoring data from the plurality of data files associated with the time period;
re-sorting the read monitoring data comprising combining sorted monitoring data to use fewer time periods having a second time period length longer than the first time period length; and
writing the re-sorted monitoring data, wherein the re-sorted monitoring data is written to storage using a plurality of data files each storing re-sorted monitoring data for the second time period, and wherein each data file, of the plurality of data files storing re-sorted monitoring data, supports storing grouped data for a plurality of the multiple tenants.

21. The computer-readable storage medium of claim 17 wherein receiving the monitoring data comprises;
buffering the monitoring data in random access memory (RAM) for a period of time, wherein the period of time is based at least in part upon an amount of available RAM.

* * * * *